United States Patent [19]
Leon et al.

[11] 3,782,334
[45] Jan. 1, 1974

[54] AUTOMATIC REAL-TIME PAIR-FEEDING SYSTEM FOR ANIMALS

[75] Inventors: Henry A. Leon, Los Altos; James P. Connolly, San Jose; Maurice J. Hitchman, Saratoga; John E. Humbert, Santa Clara, all of Calif.

[73] Assignee: The United States of America as represented by the Administrator of the National Aeronautics and Space Administration, Washington, D.C.

[22] Filed: Nov. 30, 1971

[21] Appl. No.: 203,271

[52] U.S. Cl.............. 119/54, 119/51 R, 119/52 AF, 119/51.13, 119/51.5, 221/265
[51] Int. Cl............................................... A01k 5/02
[58] Field of Search....................... 119/51 R, 51.11, 119/51.13, 51.5, 52 AF, 53.5, 54, 56 R, 57, 29; 221/265

[56] References Cited
UNITED STATES PATENTS 3,452,716 7/1969 Molimard .................... 119/51.13 X
3,415,228 12/1968 Myers ......................... 119/52 AF X Primary Examiner—Louis G. Mancene
Assistant Examiner—J. A. Oliff
Attorney—Darrell G. Brekke et al.

[57] ABSTRACT

A pair-feeding method and apparatus are provided for experimental animals wherein the amount of food consumed by the experimental animal is immediately delivered to a normal or control animal so that there is a qualitative, quantitative and chronological correctness in the pair-feeding of the two animals. The invention also provides a novel feeding mechanism for delivering precisely measured amounts of food to a feeder. Circuitry is provided between master and slave feeders so that there is virtually no chance of a malfunction of the feeding apparatus, causing erratic results. Recording equipment is also provided so that an hourly record is kept of food delivery.

4 Claims, 10 Drawing Figures

HENRY A. LEON
JAMES P. CONNOLLY
MAURICE J. HITCHMAN
JOHN E. HUMBERT
INVENTORS

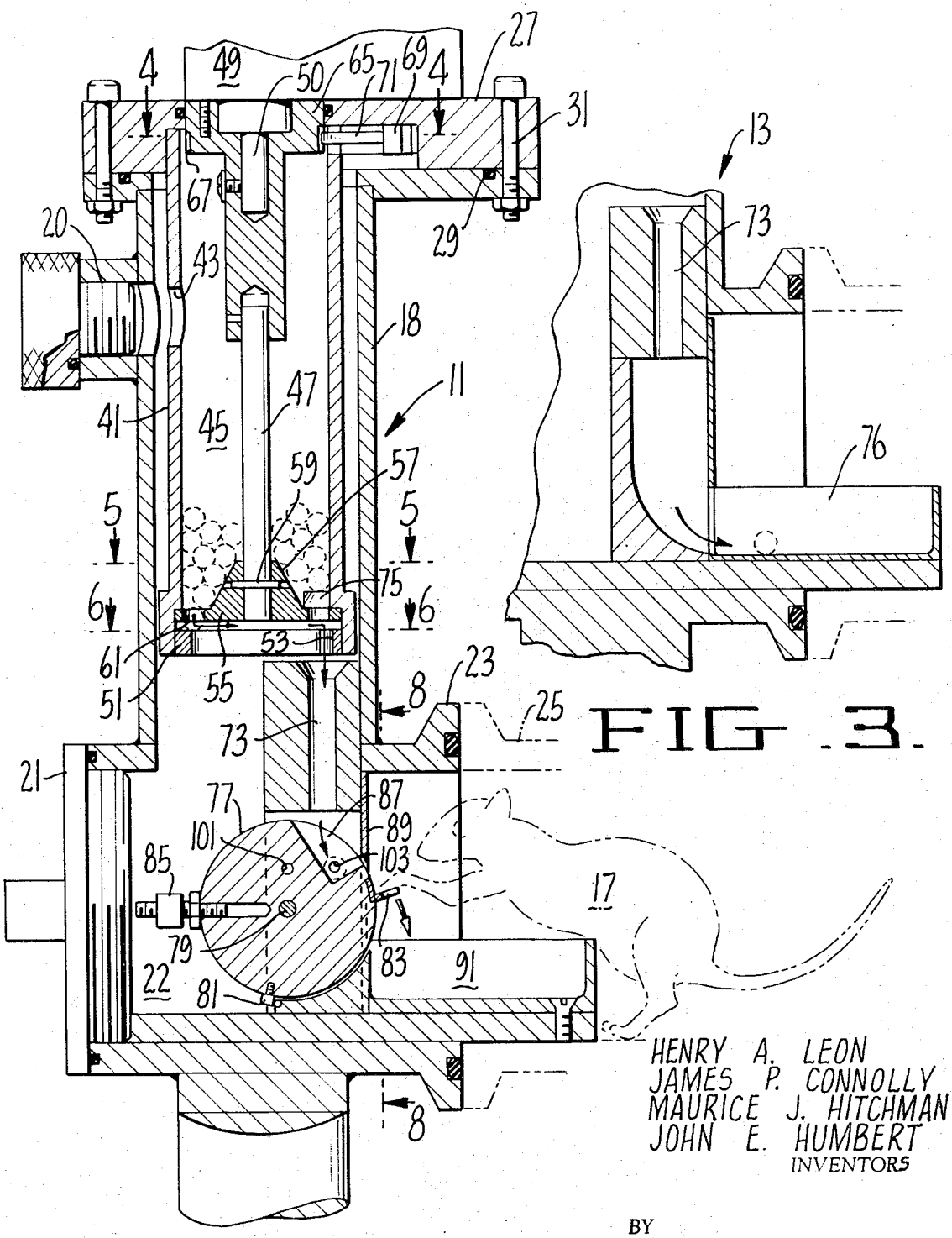

PATENTED JAN 1 1974 3,782,334

HENRY A. LEON
JAMES P. CONNOLLY
MAURICE J. HITCHMAN
JOHN E. HUMBERT
INVENTORS

BY
James G. Baker
ATTORNEY

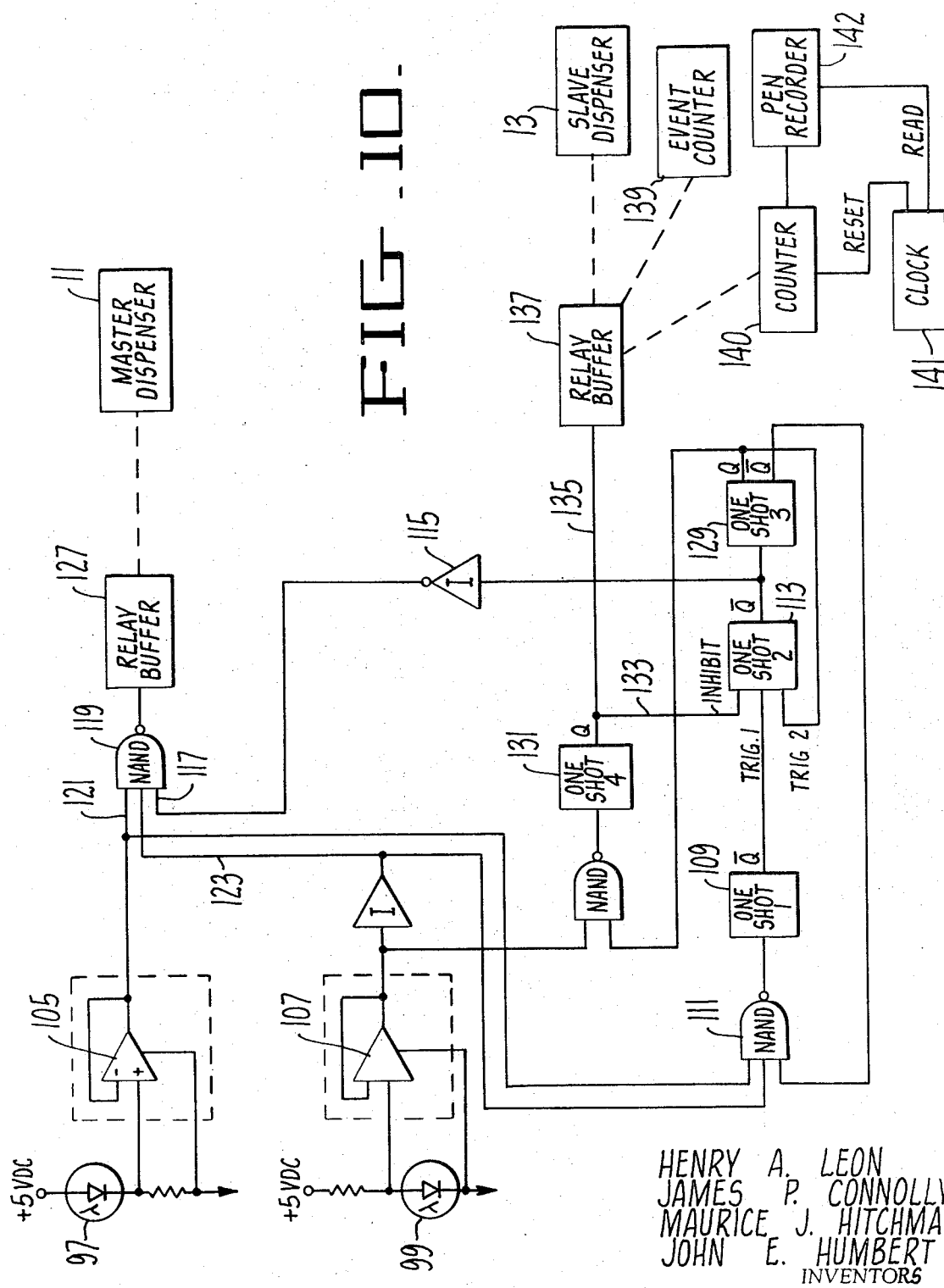

AUTOMATIC REAL-TIME PAIR-FEEDING SYSTEM FOR ANIMALS

The invention described herein was made by employees of the United States Government and may be manufactured and used by or for the Government for Governmental purposes without the payment of any royalties thereon or therefor.

BACKGROUND OF THE INVENTION

1. Field of the invention

Pair-feeding system for animal experiments.

2. Description of the prior art

Pair-feeding is a relatively new biological technique wherein an experimental animal is subjected to some unusual condition and a control animal, exposed to normal conditions, is fed the same amount of food as the experimental animal. As an example, one might wish to test the effect of substituting neon for nitrogen in the atmosphere which animals breathe. The experimental animal would breathe a neon-oxygen mixture while the control animal would breathe normal air. In conducting such experiments, it is desired that both animals have the same amount of food and in the past this has been accomplished by supplying the experimental animal with a given quantity of food and, after a certain period of time, usually 24 hours, the food remaining was weighed or measured and by difference the amount of food consumed by the experimental animal was calculated. This calculated quantity of food was then given to the control or normal animal during the next 24 hours and so on. This system has a number of disadvantages Primarily there is a 24-hour lag in the pair-feeding schedule between the experimental and control animal. Further, the pair-feeding is ordinarily accurate only for a 24-hour period since it would involve an excessive amount of time and labor to do this in shorter intervals. Thus, there may be fluctuations in the eating habits during the day which could affect the parameter under study and the amount of food eaten in a short time interval, e.g. one hour, is not measured. Since time is frequently a factor affecting a parameter under study, the 24-hour time lag might be a cause for an erroneous comparison. Further, the sensitivity or accuracy of the testing equipment could easily fluctuate sufficiently from day-to-day making the comparison of one day's results with the next inaccurate.

SUMMARY OF THE INVENTION

The method and apparatus of the present invention represent a distinct improvement in that an automatic real-time pair-feeding system is provided. In general, a system is provided wherein the experimental animal controls the amount of food which is available to the control animal. This is accomplished on a substantially instantaneous basis so that there is no lag between the time the experimental animal eats and when the equivalent amount of food is available to the control animal. Thus there is no fluctuation based on irregular eating habits of the animals and one has an accurate real-time pair-feeding.

The equipment provides for recording short time intervals, such as one hour, so that accurate histogram records may be kept on a round-the-clock basis.

The equipment provided has electronic interlocks built into it so that the possibility of a malfunction is substantially eliminated.

Included in the invention is a food dispensing system of simple structure which gives accurate, reproducible results.

BRIEF DESCRIPTION OF THE DRAWINGS

FIG. 2 is an enlarged section on the line 2—2 of FIG. 1.

FIG. 3 is an enlarged section on the line 3—3 of FIG. 1.

FIG. 10 is a schematic diagram of the control circuit.

DESCRIPTION OF THE PREFERRED EMBODIMENTS

Figure 1:
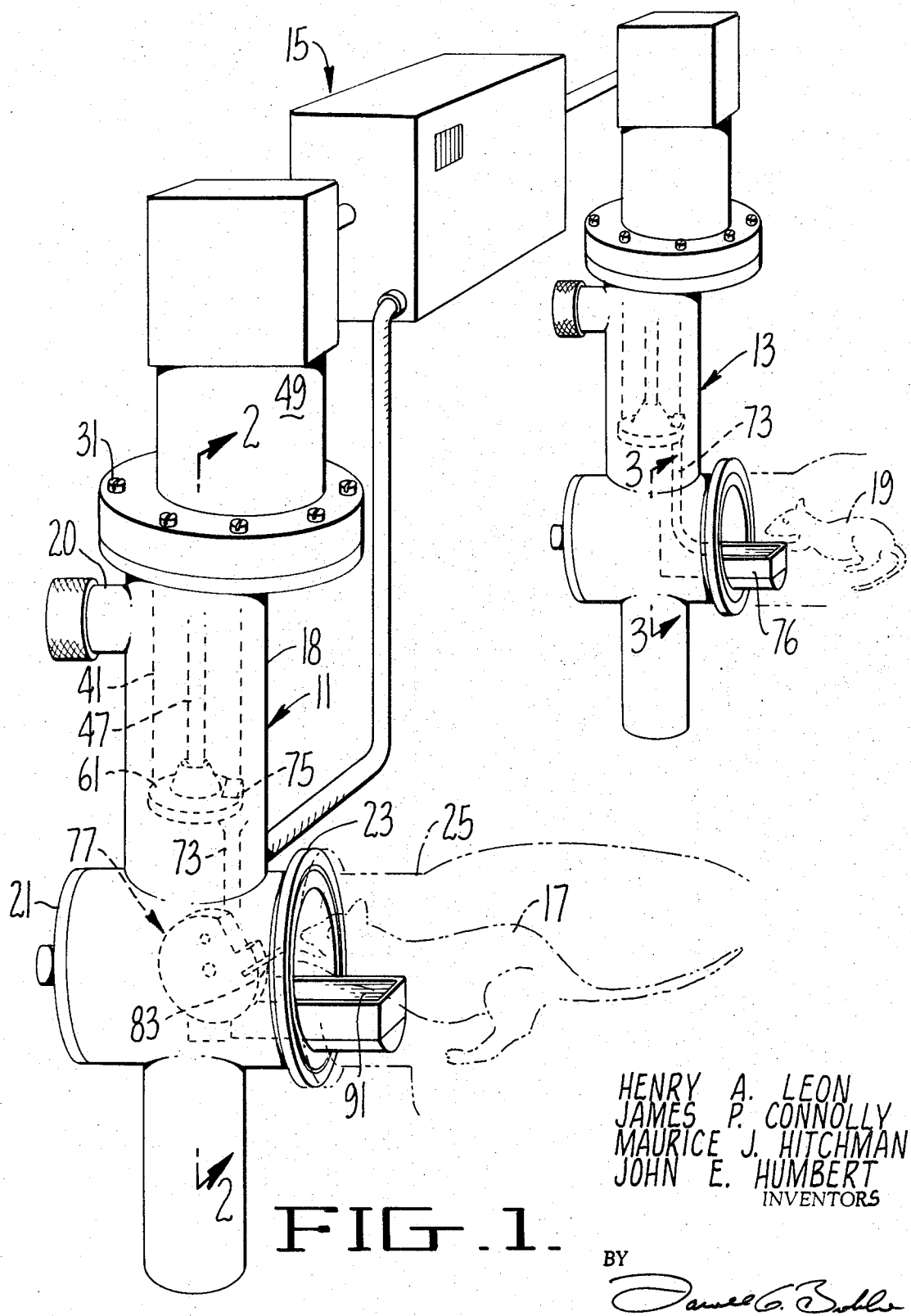
FIG. 1 is a perspective view of a pair of feeding stations and associated control apparatus embodying the present invention.
Figure 4:
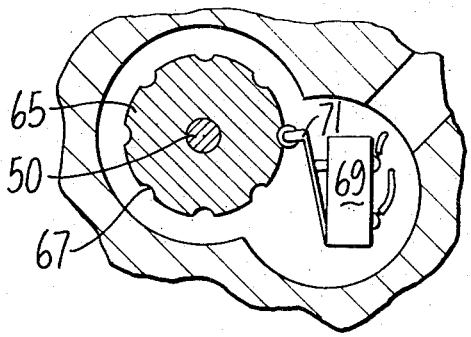
FIG. 4 is a section on the line 4—4 of FIG. 2.
Figure 5:
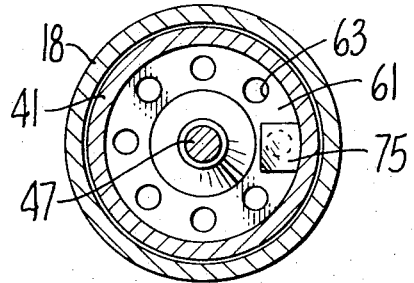
FIG. 5 is a section on the line 5—5 of FIG. 2.
Figure 6:
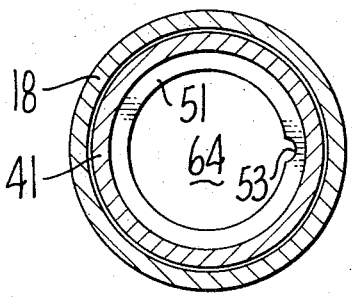
FIG. 6 is a section on the line 6—6 of FIG. 2.
Figure 7:
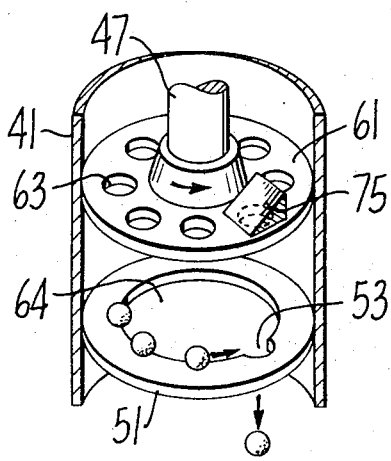
FIG. 7 is a partial exploded view of a portion of the dispensing mechanism of the feeder.
Figure 8:
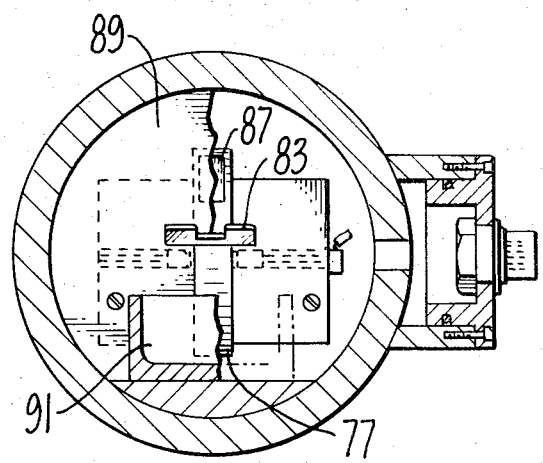
FIG. 8 is a section on the line of 8—8 of FIG. 2.
Figure 9:
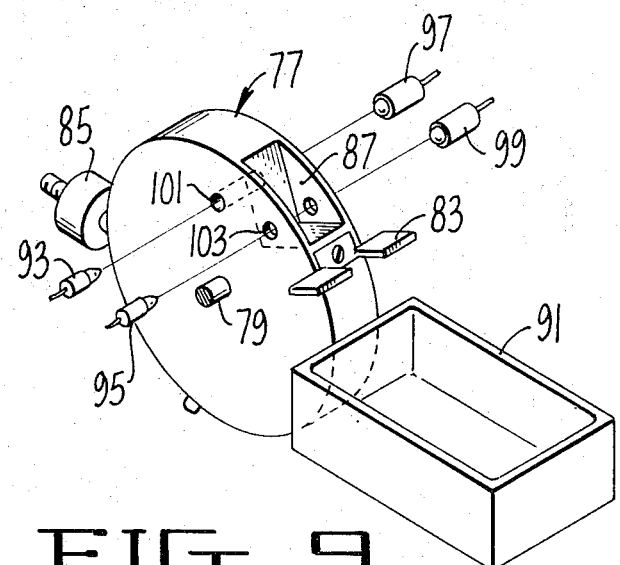
FIG. 9 is a perspective view of the pellet wheel and associated photoelectric equipment.

The general overall operation of the present invention is shown in FIG. 1. The device consists of three main units, namely, a master feeding station 11, a slave feeding station 13, and a control mechanism generally designated 15. The operation is such that an animal such as experimental rat 17 is subjected to a certain environment and is allowed to determine the amount of food which is made available to him. A second animal such a control rat 19 is then automatically fed the same amount of food by means of the interconnection through the control mechanism 15. As an example, the experimental rat 17 might be maintained in an artificial atmosphere such as a mixture of neon and oxygen while the control rat 19 has a normal air atmosphere. Since the experimental animal controls the amount of food available and this same amount is immediately made available to the control animal, true real-time pair-feeding is achieved.

Since the feeder mechanism itself is an important part of the device, this will be described in detail first. The feeder itself is built within a tubular member 18 which has an opening 20 for the introduction of feed, a clean-out opening 21 leading to a chamber 22 so that discarded pellets and the like can be removed as well as allowing access to the mechanism, and an opening 23 to which an animal cage as at 25 may be attached. The upper portion of the cylinder is closed by plate 27 and it will be noted that all of the openings are provided with gaskets, as for instance at 29, so that the whole system can be maintained air tight. Bolts as at 31 maintain plate 27 in assembled relationship with the rest of the apparatus. Most of the feeding mechanism is suspended from the plate 27, as is shown, providing for easy disassembly and reassembly of the mechanism.

The mechanism proper includes an inner cylinder 41 suspended from the plate 27, having an opening 43 in alignment with the side opening 20 so that pellets can be placed in the feed chamber 45. Mounted within the inner cylinder 41 is a shaft 47 adapted to be turned by a motor 49 through coupling 50. Mounted at the bottom of the tube 41 is a fixed disc 51 having an open center 64 and having a single notch 53 therein. Mounted over the disc 51, and in close proximity thereto, is the disc 55 which has a conical hub portion 57, keyed on shaft 47 by means of pin 59. Disc 55 has a flat outer rim 61 having a plurality of evenly spaced holes 63 around the periphery. In the embodiment illustrated, eight holes are shown although it is obvious that a smaller or larger number might be used. Disc 51 is of such a size that the holes 63 of rim 61 are about half covered. Aperture 64 permits the release of pellet particles into space 22 to reduce the likelihood of pellet particles jamming between disc 55 and disc 51 and reduces the possibility of less than whole pellets dropping through tube 73.

Mounted on coupling 50 of motor 49 is a cam wheel 65 having a plurality of detents 67, the number and spacing of the detents 67 corresponding with the number in placement of the holes 63. A miniature switch 69 having a contact arm 71 is mounted adjacent the cam wheel 65 with the end of the contact arm 71 adapted to rub against the cam and drop into the detents. Motor 49 is wired in such a way that a single pulse will start the motor which will then close the switch 69 and keep the motor operating until arm 71 falls into the next detent 67.

Mounted directly below the cut-out 53 of disc 51 is a feed tube 73. Mounted directly above the cut-out 53 of disc 55 and over rim 61 and fastened to tube 41 is a diverting wedge 75. The diverting wedge 75 prevents pellets from falling directly from the hopper 45 through the holes 63 and into the feed tube.

The structure described thus far is common to both the master and the slave units and its operation will now be described. When pellets are inserted through the opening 19 into the chamber 45 they naturally tend to drop into the openings 63 but are prevented from falling through the openings 63 by means of the ring 51 which forms a track for the pellets. The pellets are of such a size that only a single pellet can pass through an opening 63 and only a pellet which is full or at least half size can balance on the disc 51. In the case of broken pellets which are too small to ride on the track, they will fall through the central opening of disc 51 and into the bottom chamber 22 where they can be periodically removed through opening 21. Thus, the holes 63 tend to fill up with full sized pellets except for the one hold which is directly under the diverting wedge 75. Now, as the motor is pulsed it will start, closing miniature switch 69, causing the motor to continue in motion until arm 71 slips into the next detent 67 stopping the motor at which time one of the openings 63 will come into alignment with the opening 53 in disc 51, allowing a single pellet to drop through the tube 73. In the case of a slave unit the pellet will merely drop into a feeding dish 76 where it will be available to be eaten by the control animal.

This is not the case with the master unit since it is this unit which operates as a control for both units. The master unit contains a delivery disc 77 which is journaled for free rotation on shaft 79. Rotation is restrained in a counterclockwise direction by a stop 81 while foot pedal 83 limits rotation in a clockwise direction. A counter balance 85 is provided which is adjusted so that normally disc 77 remains in the counterclockwise or up position. Disc 77 has a pellet slot 87 therein and mounted above the disc is a guard 89 so that an animal cannot get at a pellet in the slot 87 without rotating the disc. When the animal wishes a pellet, it presses on pedal 83. This causes the disc 77 to rotate in a clockwise direction, depositing any pellet which might be in the pocket 87 into the feeding dish 91 so that it is now available for the animal to eat. When the animal releases the pedal, disc 77 returns to its counterclockwise position.

Mounted adjacent to disc 77 are a pair of small lights 93 and 95 while at the opposite side of the disc are photodiodes 97 and 99. The light from 93 can pass through a hole 101 in the disc 77 while the light from 95 can pass through holes 103 of pocket 87. Light can pass through hole 101 only when it is in the up or counterclockwise position. Light can pass through opening 103 only when the disc is not only in the up position but also when there is no pellet in the pocket. Thus, if photodiode 97 is excited due to the fact that the wheel is in the up position and simultaneously diode 99 is excited by the fact that the disc is not only in the up position but that there is no pellet in the pocket, this is used to cause the feed mechanism to pulse and to feed another pellet into the feed pocket. Naturally, at the time a new pellet is sent to the feed pocket, a pellet is simultaneously made available to the control animal.

Referring now specifically to FIG. 10, the circuitry will be described. The outputs from the photodiodes 97 and 99 are passed through the isolating amplifiers 105 and 107. A change in the voltage level at 99 triggers a one-shot multivibrator 109 through NAND gate 111, the other inputs to which are later described. The one-shot multivibrator 109 has an on-time of about 12 seconds and when 109 turns off, a second one-shot multivibrator 113 turns on. The output of multivibrator 113 is passed through inverter 115 into one input 117 of nand gate 119. At this point, if a light is present on the cell 97, i.e. disc 77 is in the up position, a signal will also be present on input 121 of NAND gate 119 and, since there is no pellet in the pocket, a signal will also be present on input 123 of gate 119 so that the three positive signals will produce a pulse actuating relay drive circuit 127 of the master dispenser 11 causing a pellet to fall into the feed slot 87. The relay is energized for approximately one second which is sufficient to close switch 69 and start motor 49 rotating and the motor continues to rotate until the next detent 67 is reached.

In the event of a malfunction, so that no pellet has been delivered to the pellet pocket, a third one-shot multivibrator 129 retriggers the multivibrator 113 causing the motor to advance again and attempt to repeat the pellet delivery. This circuit is designed as a back-up mechanism in case a pellet is not delivered on the first attempt. However, if a pellet does arrive in the pellet pocket, cutting off the photodiode 99, a fourth one-shot multivibrator 131 is activated and this inhibits 113 by sending a pulse through line 133 so that the motor does not again attempt to drop a pellet. The signal from 131 also passes through line 135 whereupon relay buffer circuit 137 is energized, activating the slave dispenser 13. Obviously when the animal takes another pellet, the whole process is repeated.

At the same time as slave dispenser 13 is activated, other devices such as counters 139 and 140 may be energized. Event counter 139 counts the cumulative number of pellets received by the master feeder and may be manually resettable. Counter 140, coupled to clock 141 and pen recorder 142, generates an analog voltage which is a function of the number of pellets counted. Periodically, for example, every hour, clock 141 turns on pen recorder 142 for five seconds and records the pellet count for that period. At the end of five seconds, a signal from clock 141 resets counter 140 to zero. The resulting bar-graph presentation on pen recorder 142 is a histogram of pellet delivery.

It is believed obvious from the foregoing that we have provided a novel feeding mechanism as well as a novel method of real-time pair-feeding wherein one animal subject controls substantially simultaneously the feeding of a control animal.

We claim:

1. Animal pair-feeding apparatus comprising in combination:
   a master feeder with means for dispensing food pellets as food is desired by an animal user;
   a slave feeder with means for immediately dispensing the same amount of food pellets as that dispensed by said master feeder;
   said master feeder including a rotatable pellet receiving pocket which delivers a pellet when said pocket is rotated by said animal usr; said rotating pocket having a pellet receiving position and a pellet discharging position;
   a pair of photodiodes with means for shining light through said pocket onto said photodiodes, one of said photodiodes detecting whether the pocket is in the receiving position and the second photodiode of said photodiodes detecting whether a pellet is in said pocket and
   a NAND gate interconnected between said photodiodes with means for discharging a pellet into said pocket when said pocket is in the receiving position and when there is no pellet in said pocket.

2. The apparatus of claim 8 further including circuit means for retriggering the pellet discharging means if a pellet is not delivered on the first attempt.

3. The apparatus of claim 2 wherein means are coupled to the master feeder for recording the number of times the master feeder is actuated.

4. Animal pair-feeding apparatus comprising in combination:
   a master feeder with means for dispensing food as food is desired by an animal user:
   a slave feeder with means for immediately dispensing the same amount of food as that dispensed by said master feeder;
   said master feeder including:
   a. a feed hopper adapted to contain a plurality of pieces of pelletized food;
   b. a rotatable disc at the bottom of said hopper, said disc having a plurality of peripheral openings therein, each of a size to receive a single pellet;
   c. a partial track under the openings of said disc, said track partly closing off the bottoms of said openings whereby a whole pellet will be retained on said track and a pellet fragment will fall off said pellet track;
   d. a single aperture in said track, said aperture underlying the path of said holes;
   e. indexing means for advancing said rotatable disc stepwise from hole to hole to discharge pellets from said disc; and
   f. a central opening in said disc whereby pellet particles will fall through said central opening.

* * * * *